(12) United States Patent
Lin (10) Patent No.: US 9,671,135 B2
(45) Date of Patent: Jun. 6, 2017

(54) SOLAR COOKING APPLIANCES (71) Applicants: W&E International (Canada) Corp., Richmond Hill (CA); Huazi Lin, Richmond Hill (CA)

(72) Inventor: Huazi Lin, Richmond Hill (CA)

(73) Assignees: Huazi Lin, Richmond Hill (CA); W&E INTERNATIONAL (CANADA) CORP., Richmond Hill (CA)

( * ) Notice: Subject to any disclaimer, the term of this patent is extended or adjusted under 35 U.S.C. 154(b) by 0 days.

(21) Appl. No.: 14/675,052

(22) Filed: Mar. 31, 2015

(65) Prior Publication Data

US 2015/0211767 A1 Jul. 30, 2015

Related U.S. Application Data (63) Continuation of application No. 13/355,201, filed on Jan. 20, 2012, now Pat. No. 9,182,145, and a
(Continued)

(30) Foreign Application Priority Data

Jul. 23, 2009 (CA) .................................... 2672760
Jul. 23, 2009 (CA) .................................... 2673702
Jul. 23, 2009 (CA) .................................... 2673703

(51) Int. Cl.
*F24J 2/02* (2006.01)
*F24J 2/46* (2006.01)
(Continued)

(52) U.S. Cl.
CPC ................. *F24J 2/02* (2013.01); *F24J 2/055* (2013.01); *F24J 2/34* (2013.01); *F24J 2/46* (2013.01);
(Continued)

(58) Field of Classification Search
CPC ........ F24J 2/02; F24J 2/055; F24J 2/34; F24J 2/46; F24J 2/4647; F24J 3/02; Y02B 40/18
(Continued)

(56) References Cited

U.S. PATENT DOCUMENTS 742,961 A 11/1903 Boone
1,442,696 A 1/1923 Nutt
(Continued)

FOREIGN PATENT DOCUMENTS

CN 201206904 3/2009
WO 2009039925 4/2009

OTHER PUBLICATIONS

Reynolds. Reynolds Wrap Aluminum Foil. Dec. 11, 2007. http://web.archive.org/web/20071211113035/http://www.alcoa.com/reynoldskitchens/en/product.asp?cat_id=1337[]_id=1789.*
(Continued)

*Primary Examiner* — Avinash Savani
*Assistant Examiner* — Rabeeul Zuberi
(74) *Attorney, Agent, or Firm* — WPAT, PC; Justin King (57) ABSTRACT

A solar cooking appliance comprises a solar heat collector for collecting and storing solar heat. A first solid heat storage and conducting material for storing and conducting solar heat, the solid heat storage and conducting material is placed within the solar heat collector, the solar heat collector heats the solid heat storage and conducting material to a temperature higher than the water boiling temperature. A heat insulated solar cooking utensil is positioned outside of the solar heat collector, having a cooking utensil and a heat insulation. A second heat-transferring and conducting material connected thermally to the first solid heat storage and conducting material to the heat insulated solar cooking utensil for transferring solar heat.

10 Claims, 8 Drawing Sheets

Related U.S. Application Data continuation of application No. PCT/CA2010/001118, filed on Jul. 19, 2010, and a continuation of application No. PCT/CA2010/001119, filed on Jul. 19, 2010, and a continuation of application No. PCT/CA2010/001120, filed on Jul. 19, 2010.

(51) Int. Cl.
*F24J 2/05* (2006.01)
*F24J 2/34* (2006.01)

(52) U.S. Cl.
CPC ............. *F24J 2/4647* (2013.01); *Y02B 40/18* (2013.01); *Y02E 10/44* (2013.01)

(58) Field of Classification Search
USPC .................................. 126/617, 704, 681, 451
See application file for complete search history.

(56) References Cited

U.S. PATENT DOCUMENTS

| | | | |
|---|---|---|---|
| 1,769,752 A * | 7/1930 | Pais | ........................... 126/273.5 |
| 3,938,497 A | 2/1976 | Andrassy | |
| 4,142,513 A | 3/1979 | Auger | |
| 4,217,882 A * | 8/1980 | Feldman, Jr. | .......... F24J 2/1047 126/636 |
| 4,281,644 A | 8/1981 | Chiles | |
| 4,442,828 A | 4/1984 | Takeuchi et al. | |
| 4,662,354 A * | 5/1987 | Stoy | ........................ F24J 2/02 126/572 |
| 4,834,066 A | 5/1989 | Collins et al. | |
| 5,167,218 A | 12/1992 | Deakin | |
| 6,124,575 A | 9/2000 | Black | |
| 7,412,976 B2 | 8/2008 | Winston | |
| 2008/0271731 A1 | 11/2008 | Winston | |
| 2008/0283046 A1 | 11/2008 | Hsu | |
| 2009/0133688 A1 | 5/2009 | La | |
| 2010/0139648 A1* | 6/2010 | Bourke | .................. F24J 2/0023 126/681 |

OTHER PUBLICATIONS

Reynolds Wrap Aluminum Foil, product introduction.
Dr.Heinz-Joachim (Jo) Muller, "Solar Steam Cooker", 2008.

\* cited by examiner

SOLAR COOKING APPLIANCES

CROSS-REFERENCE TO RELATED APPLICATIONS

This application is a continuation of U.S. application Ser. No. 13/355,201 filed on Jan. 20, 2012, which claims priority of International Application No. PCT/CA2010/001118 filed on Jul. 19, 2010, PCT/CA2010/001119 filed on Jul. 19, 2010, and PCT/CA2010/001120 filed on Jul. 19, 2010, which these PCT applications further claim priorities over the Canadian Application No. 2,672,760 filed on Jul. 23, 2009, Canadian Application No. 2,673,703 filed on Jul. 23, 2009, and Canadian Application No. 2,673,702 filed on Jul. 23, 2009, respectively. The entire contents of which are incorporated herein by reference.

FIELD OF TECHNOLOGY

The present disclosure relates to solar heat application field, especially related to solar cooking appliances to cook the foods in the solar utensil thermally connected to a solar heat collector in which solid heat storage and conducting material is placed.

BACKGROUND

For all kinds of existing energy sources in the earth, solar energy is the most widespread, the richest and the most uniformly distributed energy source. Solar energy can be used very easily. It is available every day, everywhere and for everybody. For all kinds of human energy consuming activities, food and beverage cooking is the most important activity and has the longest history. Therefore, it is very interesting and valuable topic to use solar energy for food cooking.

The solar radiation intensity is varied at different regions of earth, and also varied at different time during the day and different seasons. The solar radiation intensity also is affected by the weather, so that to develop an economic effective solar cooking appliance is always a challenge and required continuous efforts.

To overcome the above mentioned difficulties, some of the solar cooking appliances employ a large sunlight receiving area. But the heat insulation for the received heat presents another challenge. Some solar cooking appliances follow and focus the sunlight using an expensive automation system, which requires additional power to operate. Some solar cooking appliances also use the heat storage materials, but the materials may be expensive and not easy to get. There are two prior arts disclose appliances having solar cooking function. They are Muller, Dr. HEINZ-JOACHIM, "Solar Steam Cooker", 46$^{th}$ ANZSES (Australia and New Zealand Solar Energy Society) conference [online], ISES-AP 2008 and Jiang-Tian Zhao (Zhao, et al.) CN 201206904 Y, "Solar Water Heater", March 2009 (11 Mar. 2009). Both applied the evacuated tube solar heat collector to heat water or to provide steam for food cooking. So the cooking temperature is limited at the water boiling temperature.

At present time, electric power demand management becomes more popular. One of the management methods is to store the electric heat at the lower power demand period for using at the high demand period. The solar cooking range/stove of this disclosure has very good heat insulation and can be a large heat energy storage device. So the solar heat range/stove can also be an electric heat storage container for electric power demand management purpose.

Therefore, it is an important topic for the industry to further develop and improve applications of the solar cooking technology to develop a set of economic and practicable solar cooking appliances.

SUMMARY

The object of this disclosure is to improve the existing technologies and provides a set of solar cooking appliances that is cost effective, easy to manufacture, use and with high efficiency.

The invention takes following steps to overcome the difficulties of applying solar energy for food cooking:

To use the evacuated solar heat collector for optimum heat collecting. To cook the foods within solar heat collector for optimum heat storage.

To filled solid heat storage and conducting material in the evacuated solar heat collector for storing, keeping heat and transferring solar heat to an electric powered solar cooking utensil or a range/stove. It not only provides a continue and stable cooking heat, solar cooking utensil. A light reflector focuses the surrounding light to the cooking appliances. A sundial indicates the light direction, an adjustable and rotatable fixing and supporting trestle allows to receiving the highest solar power. An electric power supply provides a backup power source when the solar power is not sufficient. Furthermore, the solar cooking appliances also provide electric energy storage equipment to store heat during the low electricity price period, such that the solar cooking appliances can provide cooking and heating during the high electric power price period or at power outage.

Following are the detailed summary of present disclosure.

In accordance with one aspect of the present disclosure there is provided a solar cooking appliance, comprising: a solar heat collector for collecting and storing solar heat; a first solid heat storage and conducting material for storing and conducting solar heat, wherein said solid heat storage and conducting material placing within said solar heat collector, wherein said solar heat collector can heat said solid heat storage and conducting material to a temperature higher than the water boiling temperature; a heat insulated solar cooking utensil positioned out of the solar heat collector, having a cooking utensil and a heat insulation, wherein said heat insulated solar cooking utensil is a heat insulated electric power cooking utensil to provide electricity as a backup heat source; and a second heat-transferring/conducting material connected thermally said first solid heat storage and conducting material to said heat insulated solar cooking utensil for transferring solar heat from said solar heat collector to said heat insulated solar cooking utensil; wherein said heat insulated solar cooking utensil is selected from a group of: a heat insulated electric power cooking utensil having said first solid heat storage and conducting material filing between said cooking utensil and said heat insulation, wherein said first solid heat storage and conducting material is connected to said second heat-transferring/conducting material; a heat insulated electric power cooking utensil to provide electricity as a backup heat source, having a fitting to receive the said second heat-transferring/conducting material directly for transferring the solar heat from said solar heat collector to said cooking utensil; and an evacuated electric power cooking utensil made of a material selected from a group of: glass, metal, synthetic, and ceramic.

In accordance with another aspect of the present disclosure there is provided a solar cooking appliance, comprising: a solar heat collector for collecting and storing solar heat; a first solid heat storage and conducting material for storing and conducting solar heat, wherein said first solid heat storage and conducting material placing within said solar heat collector, wherein said solar heat collector can heat said solid heat storage and conducting material to a temperature higher than the water boiling temperature; an electric power supply providing a backup heat source, comprising: an electric heat element located under the airtight reservoir and within heat storage and conducting material; a heat insulated solar cooking utensil positioned outside of the solar heat collector; and a second heat transferring/conducting material comprising: an airtight reservoir containing a liquid and located in the solar heat collector; a liquid conduit having a first end and a second end, and said first end extended into said airtight reservoir and submerged into said liquid, and said second end is inserted into said heat insulated solar cooking utensil, and said liquid is selected from a group of: water and oil.

In accordance with another yet one aspect of the present disclosure there is provided a set of solar cooking appliances, comprising: a solar heat collector to collect and store solar heat, a first solid heat storage and conducting material filled in the solar heat collector, said solar heat collector can heat said solid heat storage and conducting material to a temperature higher than the water boiling temperature; a solar cooking range/stove having a heat insulated and enclosed compartment and a cooktop covering top surface of said solar cooking range/stove, a third solid heat storage and conducting material filled in the heat insulated and enclosed compartment of said solar cooking range/stove, and said solar cooking range/stove thermally connected with said solar heat collector to receive and store solar heat for food cooking, a set of cooking chambers arranged in said enclosed compartment and located in said second heat storage and conducting material, a second heat-transferring/conducting material thermally connected said solar heat collector to said third heat storage and conducting material within said solar cooking range/stove for transfer the solar heat faster, a set of cooking utensils with heat insulated lids, said cooking utensils located in the cooking chambers of said solar cooking range/stove, a set of removable parts for covering said cooking chambers, a set of removal parts for inserting said cooking chambers, an electric power heater arranged in said range/stove to provide a backup energy source and electric heat storing, Other aspects and features of the present disclosure will become apparent to those ordinarily skilled in the art upon review of the following description of specific embodiments of the invention in conjunction with the accompanying figures.

BRIEF DESCRIPTION OF THE DRAWINGS

The advantages and spirit related to the present invention can be further understood via the following detailed description and drawings.

DETAILED DESCRIPTION

Figure 1:
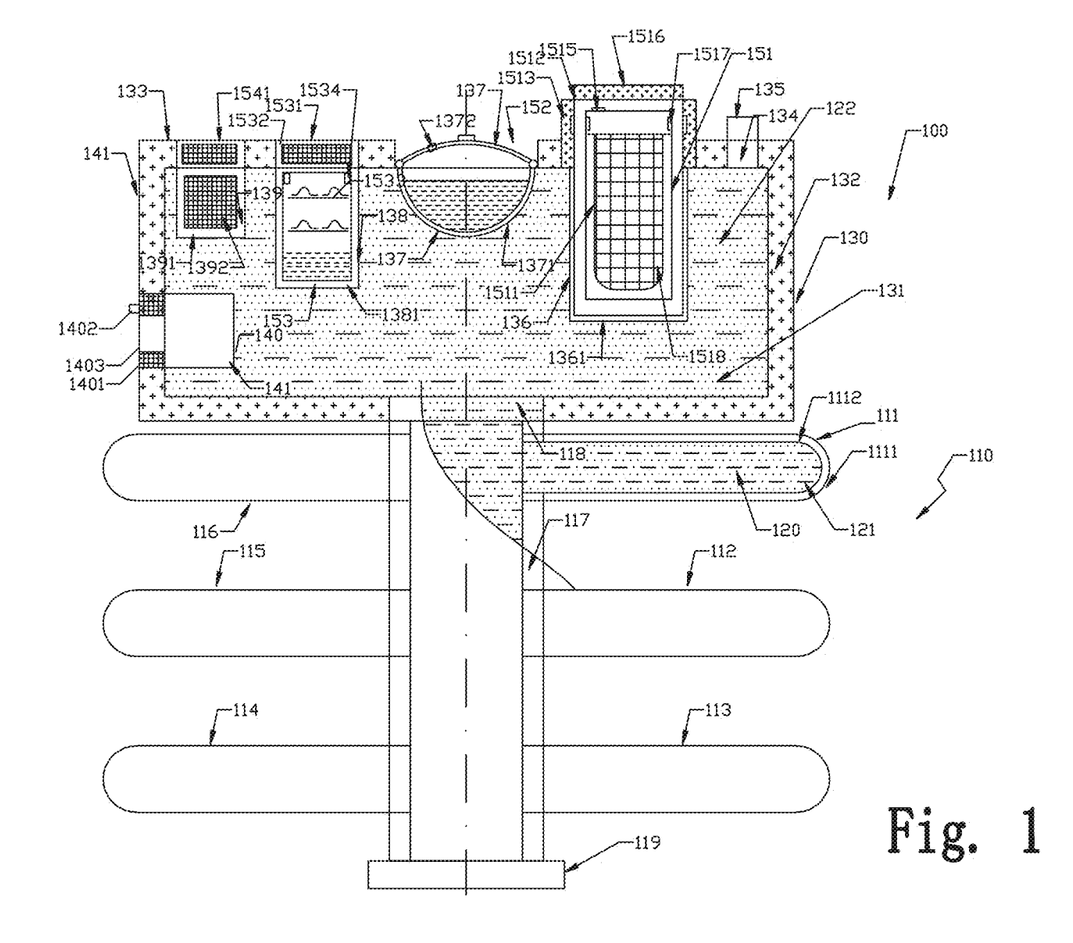
FIG. 1 is a schematic side view of a set of exemplary solar cooking appliances comprising a solar cooking range/stove, a set of cooking utensils and a solar heat collector filled with solid heat storage and conducting material.

Referring to FIG. 1, a set of exemplary solar cooking appliances 100 is illustrated in schematic side view during use. Wherein a solar heat collector 110 is illustrated schematically in partial cross section view and a solar cooking range 130 is illustrated schematically in vertical section view. The solar cooking appliances 100 comprises the solar heat collector 110 filled with a first solid heat storage and conducting material 120, the solar cooking range 130 filled with third solid heat storage conducting material 122, the solar cooking utensils 151, 152, 153 and accessories. A second heat conducting/transferring material 121 transfers solar heat from solar heat collector to the solar cooking range 130.

In this case, the first and third solid heat storage and conducting materials 120 and 122 are the same material. It is sand. They may be different kinds of solid heat storage and conducting materials, e.g. salt and sand. They also can be different kinds of solid heat storage and conducting materials. The second heat conducting/transferring material is heating oil 121. One open end 118 of solar heat collector 110 is extended into solar cooking range 130. The heating oil 121 connects and submerges in the sands 120 and 122. It transfers the solar heat from 121 to 122. Furthermore, the heating oil circulates automatically in solar heat collector 110 and the enclosed compartment 131 of range 130.

For a solar cooking appliance the solar heat collector may be any kind of solar heat collector. In this case it is a plurality of module evacuated tube solar heat collector. Usually the evacuated solar heat collector has a better heat insulation feature to keep the stored solar heat. The solar heat collector has to be able to heat the first solid heat storage and conducting material 120 and the third solid heat storage and conducting material 122 to a temperature higher than the water boiling temperature. This disclosure introduces the first and third heat storage and conducting materials to store solar heat in the solar heat collector, solar cooking utensil and solar cooking range. So the first and third heat storage and conducting materials have a working temperature higher than the water boiling temperature. Therefore the solar cooking appliance can work at a temperature higher than water boiling temperature. The first and third heat storage and conducting materials can provide the stored heat for cooking at the water boiling temperature continuously and stably even if the sunlight is temporary not available.

In FIG. 1, the solar heat collector is a plurality of modular evacuated-tube solar heat collectors 111, 112, 113, 114, 115 and 116 that extend their one open ends into a conflux tube 117 and are mounted in a parallel row. Depending on the cooking requirements, the group of modular evacuated-tube solar heat collectors may be mounted in other shapes like a cone column etc. The number of the tubes is also depended on the cooking demand and may vary. The one end 119 of the solar heat collector 110 is closed and another end 118 is an open end extended into the enclosed compartment 131 of the solar range 130.

The evacuated-tube solar heat collectors 111-116 have a transparent outer layer 1111 and inner layer 1112 and are evacuated in between. The inner layer 1112 has a heat absorbing coating (not show in the FIG. 1). The evacuated-tube solar heat collector can be purchased in market. They are usually used for solar heating water.

The solar heat collector that can be used in solar cooking appliances can have many different structures. They are illustrated schematically in FIG. 8.

The evacuated-tube solar heat collector is made of glass. In case the glass tube is broken, the broken glass pieces are dangerous for the user. So the solar heat collector may need a transparent cover for safety reasons. (not shown in FIG. 1). The transparent cover may be a plastic cover. It can be either the mantles for each tube or a protective cover for an entire collector panel. But the plastic protective mantles may reduce the efficiency of the solar heat collector. So an evacuated toughened-glass tube solar heat collector is a better solution, if it is available.

The first solid heat storage and conducting material 120 is filled in the solar heat collector 110. In this case, it is sand. The third heat storage and conducting material 122 is filled in the enclosed compartment 131 of the solar cooking range 130. In this case, it is sand too. In many cases the first and third heat storage and conducting materials can be the same one material and simply called first solid heat storage and conducting material. It also can be two different materials. For example when the third solid heat storage and conducting material is filled in a heat insulated utensil, we prefer to use the cooking salt for a safety reason and use the sand in the solar heat collector for a cost reason. The second heat conducting/transferring material 121 is filled in both solar heat collector 110 and solar cooking range 130. In this case it is heating oil. The heating oil 121 transfers the solar heat by liquid circulation. In fact, we can also take out the heating oil and leave the sand only in the solar cooking appliance. In this case we may need count the inner walls of the solar heat collectors and the solar cooking range as part of the second heat conducting/transferring material.

The requirements of first and third heat storage and conducting materials are mainly as following: high ratio of heat capacity, high heat conductivity, safe for use, cheap and easy to get. As mentioned before, to make sure a continued and stable cooking, we also require the heat storage and conducting material can be heated to a working temperature higher than the water boiling temperature. So it is not necessary for the solar heat collector 110 to use the materials only mentioned above. There are many materials can become the first and third solid heat storage and conducting materials, whatever it is a simple solid material, a chemical solid material, or it is a combination of above mentioned materials. A claim lists a group of the heat storage and conducting materials. Each material has its advantages and disadvantages that need us to consider. Following are some notes to the examples of the claim:

Many of the solid material are good heat storage and conducting material with some disadvantages. The quartz sand is a kind of ore. It is a safe, cheap, easy to get material, but its heat conductivity is low. Graphite is a kind of ore too. It has good heat conductivity, but is more expensive than quartz sand. Coal and turves are two kinds of fossil and have good heat conductivity, but their heat capacity ratio is not very high. Metal (e.g. steel, copper aluminium etc.) and alloy (e.g. stainless steel, copper or aluminium alloy etc.) have good heat conductivity and are easy to manufacture in different shapes, but they are expensive. Sand and soil are easy to get and very cheap anywhere, but the components of sand and soil are varied from one place to another.

The liquid can store heat and the flowing liquid transfers the heat easily. Water and oil are two typical liquids. The prior solar cooking appliances use water in the hot water tank or water steam directly from a solar heat collector to cook the food. In our disclosure, the water is not considered as a solar heat storage and conducting material. Because it's maximum working temperature is the boiling temperature, so it can't provide a continued and stable heat source for food cooking. Water has a very high heat capacity ratio. The water under high pressure can have a high boiling temperature for using in solar cooking appliances. The pressured water is one of the heat storage and conducting material of this disclosure. Special attention needs to put to the safety measures of the pressured water.

The boiling temperatures of many kinds of oil are usually higher than the water boiling temperature. The cooking oils such as colza oil, bean oil, peanut oil, tea-seed oil etc. are safe to eat. They are good to be the heat conducting materials. The petroleum and its products such as heating oil, fuel oil, transformer oil and diesel have much higher boiling temperature than water. They are cheaper than cooking oils and are good heat transferring materials too. One of the disadvantages of these kinds of oils is not safe when the solar cooking appliance is over heated or work with an electric heat element. Furthermore some volatilized materials of these kinds of oils may be not good for hearth. The cooking oil is a human food. Except in some special cases, we do not suggest to use cooking oil as a heat storage and conducting material.

Many kinds of the solid chemical heat storage materials can become heat storage and conducting materials such as a multi-water chemical or a paraffin. They may have special advantage of a high heat capacity ratio. We also need to protect their potential harm effect that may be caused after a long period of the operation.

The combination of two or more kinds of above mentioned materials are often used. For example plumbaginous paraffin (graphite and paraffin) have good heat conductivity from graphite and phase change heat capability from paraffin. To fill the oil into sand, it not only save the oil and make it more safety, but also have good heat transferring capability from the oil flow.

The purpose of the long list of the claim 4 and above detailed discussion is to prove that there are so many materials in the world can be used as the solar heat storage and conducting materials. We have to find and use the best local materials for solar cooking appliances. This is not only necessary for save energy and cost, but also possible in the technical point of view.

The solar range 130 includes an enclosed compartment 131 wherein the third solid heat storage and conducting material 122 is filled. It also includes the heat insulation layer 132, cooktop 133, and a hole 134 on the cooking top with a fitting 135. The hole 134 is for air breathing and the expansion of the second solid heat storage and conducting material. Within the range 130, several chambers 136, 137, 138 and 139 are arranged. They provide the locations for the utensils.

The enclosed compartment 131 usually is closed by a metal e.g. stainless steel plate. It also can be a steel, a copper or an aluminium alloy. The metal is easy for processing and easy to make an airtight box. It is important to use metal for a liquid container. For the cost or other reason, a different material can replace the metal. They are selected from the group of a plastic, a ceramic, a concrete, a brick, a stone, a wood, a bamboo, a soil and any hybrid combination of above mentioned materials and metals. The use of non-metal materials not only is cheaper but also save the energy used to manufacture a metal.

The heat-insulated layer 132 on the surface of the solar cooking range is a heat-insulated coating, e.g. ceramic coating in this case. It also can be a removable heat insulated greatcoat. A cooktop 133 covers the top of the range on the surface of the heat insulation coat.

A smaller closed part 140, usually named as oven, is located in the solar cooking range 130. The oven 140 is closed by heat conductive metal 141, e.g. stainless steel or copper sheet. The oven is surrounded by the third heat storage and conducting material 122. The oven 140 has a heat insulated door 1401 with a watching eye 1403 at a side wall of said solar cooking range and a handle 1402. The oven 140 further includes a removable drawer (not shown in FIG. 1) filled with the third heat storage and conducting material 122. It locates in the oven 140 when the oven is out of service to add the heat capacitance of the range.

In the solar cooking range 130, the cooking utensils 151, 152, 153 and 154 are inserted within the chambers 136, 137, 138, 139 respectively for food cooking. These chambers are formed within the third heat storage and conducting material 122. In FIG. 1, we can see that the walls 1361, 1381 and 1391 of chambers 136, 138 and 139 are in cylinder bucket shape, and 1371 is in hemisphere shape. The chambers have their open tops on the cooktop 133. The cooking chambers 136, 137, 138, 139 are enclosed by heat conductive material, e.g. stainless steel or copper for separating the heat storage and conducting material from the cooking utensil. The removable parts 1516, 1521 (not shown in FIG. 1), 1531, 1541 cover the chambers 136, 137, 138 and 139 for heat insulation purpose. There are four heat insulation blocks prepared for each chamber (in FIG. 1 only 1392 is shown). They are prepared for inserting in the chambers when some cooking chambers are out of service. The heat insulation block is taken out when a chamber is in use.

In FIG. 1, the cooking utensils 151, 152, 153 at the solar cooking range 130 represent some different kinds of the solar cooking utensils.

The utensil 151 is a deep fryer in cylinder bucket shape. A fry basket 1518 is located inside of the utensil. Its lower part inlays in cooking chamber 136 and its wall 1511 has a closed heat connection with the chamber wall 1361. The upper part of utensil 151 is heat insulated by a heat insulation greatcoat 1513. A heat insulation cover 1516 covers the lid 1515. There is a detachable handle 1517 inside of utensil 151.

The utensil 152 is a pot or wok in hemisphere shape to match the size and shape of the chamber 1371. It is inlayed fully in the chamber 137. It has a two layers toughness glass lid 1373 with a hole 1372 for steam leaking.

The utensil 153 is a steamer in cylinder bucket shape. A two layers steamer basket 1533 is arranged within the steamer. It inlays in cooking chamber 138 and has a closed heat connection with the chamber wall 1381. A heat insulation cover 1531 covers the lid 1532. There is a detachable handle 1534 inside of utensil 153.

Based on above detailed descriptions, we can find that the common features of these solar cooking utensils are as follows:

A. The body of the utensil is mainly in cylinder bucket shape or in hemisphere shape.
    B. The utensils are inlayed fully or partially in the cooking chambers of solar cooking range and have a closed heat connection with the chamber walls.
    C. The utensil's parts out of the chamber are heat insulated.
    D. The lid of the utensil is heat insulated, either by a cover or has two layers.

In other cases, the solar heat collector may be a mounted panel. It may have two ends extended into the range. It may also connect the one end or two ends through conduit(s) with the range and transfer the solar heat from the solar heat collector 110 to the solar cooking range 130.

Figure 2:
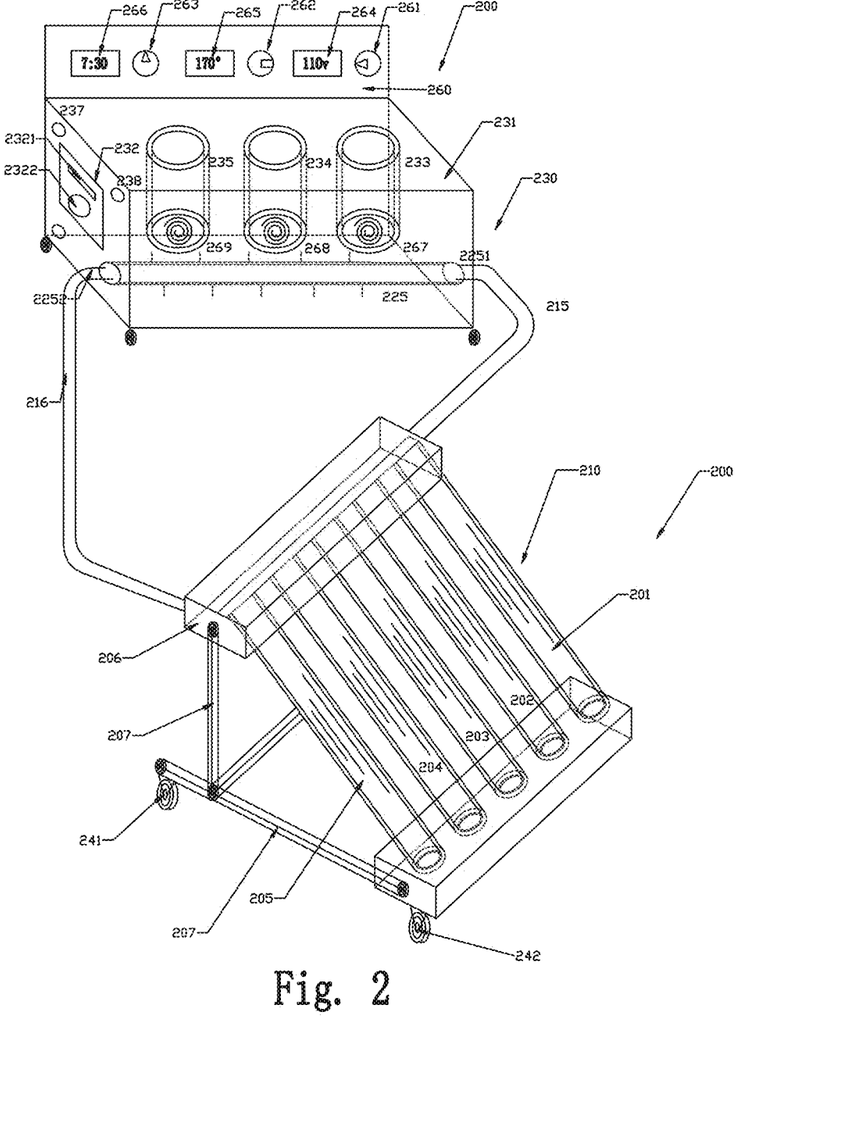
FIG. 2 is a perspective view that illustrates schematically a set of solar cooking appliances comprising the backup electric heating elements, operation parameter indication and control system.

FIG. 2 is a perspective view that illustrates schematically a set of alternative solar cooking appliances 200 including the backup electric heating elements, measuring, indicating and controlling system. Referring to FIG. 2, a set of solar cooking appliances includes a solar heat collector 210, a solar cooking range 230, two liquid conduits 215 and 216 connected the solar heat collector 210 with the heat exchanger 225. The heat exchanger is equipped in the solar cooking range 230. The solar heat collector 210 is a modular panel mounted by 5 evacuated-tube solar heat collectors having its inlet 211 and outlet 212. The first solid heat storage and conducting material 220 is filled in the solar heat collector 210. In this case it is sand.

The solar cooking range 230 includes an enclosed compartment 231 with a heat insulation coat (not shown in FIG. 2). The third solar heat storage and conducting material 222 is filled in the solar cooking range 230. (not shown in FIG. 2). In this case it is turves. (not shown in FIG. 2). An oven 232 is arranged in 231 with a handle 2321 and a watching eye 2322. The oven 232 further includes an equipped upper electric heat element and/or a lower equipped electric heat element with power supply as a backup energy source. (not shown in FIG. 2)

Three chambers 233, 234 and 235 are located in the solar cooking range 230 and surrounded by the third heat storage and conducting material 222, it is turves. Three electric heat elements 267, 268 and 269 are equipped in the bottoms of the chambers 233, 234 and 235 respectively. The electric heat elements 267, 268 and 269 have their power supply and switchers 261, 262, and 263. The switchers 261, 262 and 263 and the data rotating indicators 264, 265 and 266 including control system are arranged on the control panel 260.

Three chambers 233, 234 and 235 have the standard module size and shape. Each solar cooking utensil used for the solar coking range 230 has a heat conductive coat sized to fit its inside size and shape with the outside size and shape of said utensil, and its outside size and shape with the inside size and shape of said standard module cooking chamber. So that even each utensil may have different shape and size, every utensil with its coat can located in any one of the standard chamber in the range 230. Furthermore each solar cooking utensil that used for the solar coking range 230, has a heat insulated coat sized to fit its inside size and shape with the outside size and shape of said utensil, and its outside size and shape with the inner size and shape of said standard module cooking chamber in said solar cooking range. So that when the electric heat element is in operation, the heat element heats one utensil and cooks the food in the utensil only. The electric power does not need to heat all the heat storage and conducting material in the solar cooking range 230.

A heat exchanger e.g. a fin tube 225 locates in the solar cooking range 230 and connects its two ends to two fittings 2251 and 2252 on the surface of the solar cooking range. The conduit 215 has one end connects to the fitting 2251 and the opposite end connects to an end 211 of the solar heat collector 210. The fitting 2252 is connected to an end of the conduit of 216. The opposite end of 216 connects the end 212 of solar heat collector 210.

The liquid second heat conducting/transferring material, i.e. fuel oil, is filled in heat exchanger 225, conduits 215 and 216. It is permeated in the sand within solar heat collector 210. The other accessories may need to circulate the liquid such as the pump are not discussed and shown in the FIG. 2.

When the sunlight 201 shines on the solar heat collector, the collector absorbs the heat and stores the heat in the sand. The second heat conducting/transferring material, i.e. fuel oil picks up the heat and carrys it through a close-loop 211-2251-2252-212-211 and transfers the heat to the turves in the solar cooking range 230. The cooking utensils 233, 234 and 235 pick up the solar heat through the heat connection with the walls of the chambers to cook the foods. When the solar power is not enough for the cooking, the electric heat elements 267, 268 and 269 provide the additional energy as a backup power source.

The solar cooking appliances 200 further include a fixing and supporting trestle 217 that arrange and support the five solar heat collectors at the proper locations and situations. It allows the adjustment of the incidence angle of the solar heat collector 210 to the sunlight. Four wheels 271, 272, 273 and 274 are installed in the four bottom corners of the supporting trestle 217 for adjust the direction of the solar heat collector 210. A sundial (not shown in FIG. 2) is a cone bar. It attaches to the solar heat collector perpendicularly for indicating the incidence angle of the sunlight. A light reflector (not shown in FIG. 2) is equipped under the evacuated-tube for focusing the surrounding sun light to the solar heat collector.

The solar cooking range 230 further includes an empty hot water tube buried in the third heat storage and conducting material and has its inlet fitting 237 and outlet fittings 238 at the wall of the range 230. When the range is cooking, the tube is empty. After the cooking or when require a hot water or steam, cool water is flowed through the tube in the range 230 to make hot water or steam.

Figure 3:
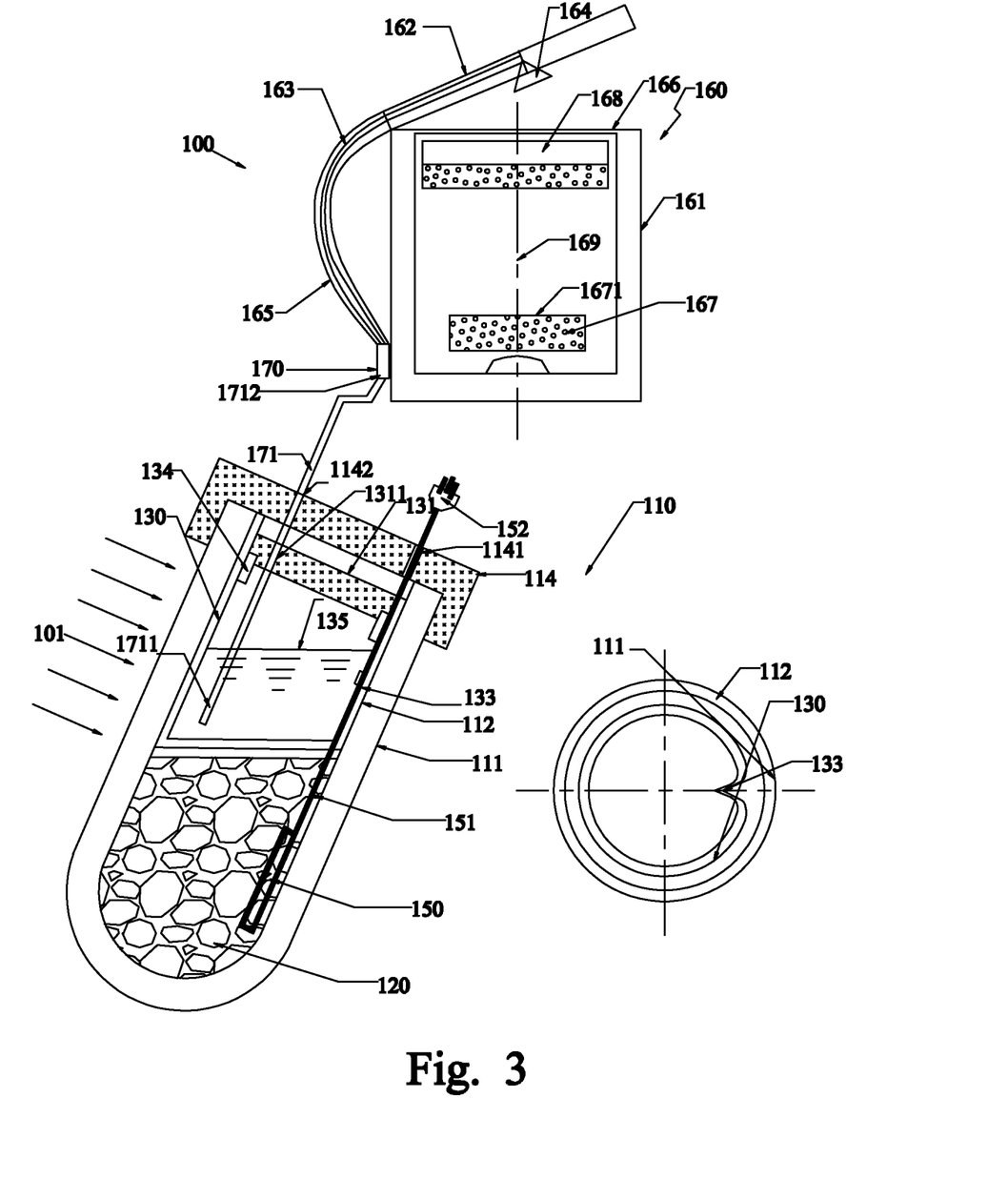
FIG. 3 is a schematic diagram illustrating an exemplary solar coffee/tea maker in vertical section view.

Referring to FIG. 3, a schematic exemplary solar coffee/tea maker 100 is illustrated in vertical section and cross section view during use. The solar coffee/tea maker 100 includes a solar coffee/tea pot 160, a solar heat collector 110 and their connecting conduit 171. The solar heat collector 110 is filled with first solid heat storage and conducting material 120.

The solar coffee/tea pot 160 is a liquid container with a lid 162. In this case it is a vacuum glass bottle 161. But the stainless steel and synthetic material are also often be used. A coffee/tea holder 166 is disposed in the pot 160. The coffee/tea holder 166 has its lower part of tea basket 167 with removable lid 1671. The upper part of the coffee/tea holder 166 is a punched coffee holder 168. A stand 169 supports the coffee holder 168 and tea holder 167. All three parts of coffee holder, tea holder and its lid can be moved through the axis 169. Based on the cooking requirement, either coffee holder or tea holder or both of them can be stayed in or removed out from the pot 160.

A hot water shower head 164 is arranged at the center of lid 162. A hot water conduit 163 passes through and is hidden in the lid 164 and the handle 165 of the pot 160. The hot water conduit 163 connects the water shower head 164 at one end. The opposite end of the hot water conduit 163 is connected to a fitting 170 that is at a lower part of the handle 165. The fitting 170 is for receiving a hot water conduit 171 from a solar heat collector 110. Solar heat collector 110 may be any kind of solar heat collector that can heat the first solid heat storage and conducting material 120 to the temperature more than the water boiling temperature. In this case the solar heat collector 110 is an evacuated-tube solar heat collector. It may also be a group of modular evacuated-tube solar heat collectors mounted in a certain shape, e.g. in parallel row or in full or partial cone-shaped column as of the examples shown in FIG. 7. The solar heat collector 110 has a removable part 114 with two holes 1141 and 1142. The hole 1141 is a path for power cable 151 and air exchange. The hole 1142 is to continue the hole 1311 for a hot water conduit 171 to go through.

The evacuated-tube solar heat collectors 110 has transparent outer layer 111 and inner layer 112. It is evacuated in between. The inner layer 112 has a heat absorbing coating that does not show in the FIG. 3. The evacuated-tube solar heat collector 110 has the same material and manufacture processing as the evacuated-tube solar heat collector that used for solar water heating. But the evacuated-tube solar heat collector 110 used in solar cooking has a larger diameter and a shorter length comparing to the regular evacuated-tube for solar hot water.

The evacuated-tube solar heat collector 110 is made of glass. In case the glass tube is broken, the glass piece is dangers for the user. So the solar heat collector 110 has a transparent cover e.g. a plastic cover for safety reason. (It is not shown in FIG. 1). If the solar heat collector 110 is a group of evacuated-tubes mounted in row, the transparent cover e.g. plastic cover may cover each tube or a plastic protective mantle may cover entire raw. But the plastic protective mantle may reduce the efficiency of the solar heat collector 110. So an evacuated toughened-glass tube solar heat collector is a better solution.

The evacuated-tube solar heat collector 110 is filled with a first solid heat storage and conduction material 120. The first solid heat storage and conducting material 120 in this case is salt or stone sand for storing and transferring the solar heat to the water container 130. In fact, many kinds of the materials can be used as the solar heat storage and conducting material. For example, they are solid materials such as salt, sand, graphite and turves. They also can be solid phase change material, such as paraffin. The combination of different materials, such as bean oil in quartz sand.

The water container 130 is a cylinder container located inside of solar heat collector 110 and above the first solid heat storage and conducting material 120. It made of stainless steel. The water container 130 has a removable part 131 with a hole 1311, it is a stopper inserted in 130. The container has a diameter near but not bigger than the inner diameter of the evacuated-tube 110. A pleated structure 133 is on the wall of the container from the top to the bottom to provide a gap and patch for air exchange and power cable 151. Furthermore, it allows a minor adjustable diameter for the container 130. The cooking utensil 130 further includes a removable and detachable handle 134 at the inner wall for removing the container 130 from the solar heat collector 110.

A removable part 114 covers the top of solar heat collector 110. It has two holes 1141 and 1142. The first hole 1141 connects to said gap and path for air exchange and power cable. The second hole 1142 continues the hole 1311 in the stopper 131 of the container 130.

The electric heat element 150 with power supply is a very low power electric heat element. It located under the water container 130 and within heat storage and conducting material 120. A power cable 151 has very high resistive heat temperature that connects the electric heat element to power supply plug 152 outside of the solar heat collector 110, through the path formed by a pleated structure 133 on the walls of the utensil 130. The electric heat element 150 may further includes a measuring, indicating and controlling systems for the solar cooking appliances operating characteristic parameter, e.g. timing, temperature, pressure, moisture etc. These are not shown in FIG. 1. The electric heat element with power supply can be removed from the set of cooking appliance. In this case the set of solar cooking appliances is still a complete cooking appliance that use solar heat as only energy source.

A hot water connecting conduit 171 is extended into said airtight solar heated water container through the holes 1142 and 1311. Its one end is submerged under the water level 135 in heated water container 130. The opposite end of said hot water connecting conduit 171 is connected with a conduit connecting fitting 170 at said handle 165 of the coffee/tea pot 160.

When the solar light 101 shines on the solar heat collector 110, the solar heat collector absorbs the solar heat and stores it in the sand 120. When the water container 130 is put into the solar heat collector 110 and the cool water is poured in, the solar heat is transferred to the solar water container 130 through the inner wall 112, heated sand 120 and heats the water. The conduit 171's end 1711 is submerged under the water level 135 in water container 130. The water container 130 is airtight. When the water is heated to boiling, the water steam gathered in the upper space of the container 130 forces the hot water flows up the conduit 171 and 163. Then the hot water is dispersed to drip evenly on the coffee grounds waiting on the coffee holder 168 through the shower head 164. The hot water picks up the coffee essence and down into the coffee bottle 161. A coffee making processing is completed. A similar processing can be used for making tea. In this case the tea or tea bag can be put in the tea basket 167.

We can also replace the water container by using the evacuated-tube 110 itself. In this case, there are no water container 130, its stopper 131 and heat storage and conducting material 120 inside of the solar heat collector 110. The removable part 114 needs to make the collector 110 becomes an airtight container. When the solar heats the water in the evacuated tube 110 to boiling, the water steam in the evacuated tube 110 presses the water upward and through the conduit 171 and 163 to make coffee. In this case the speed and quantity of coffee making are dependent on the real time solar power. It may be not continued and stable. When we use the water container 130 located in a evacuated tube 160 filled with first solid heat storage and contacting material 120, we can use the stored heat to make coffee and tea at any time continuously and stably.

When the solar heat is not enough for cooking, electric element 150 heats the water container inside of the solar heat collector 110. Because the tube 110 has very good heat insulation feature, so the required electric power is very low. In this case, the electricity has very high cooking efficiency. Based on the idea of a solar coffee/tea maker mentioned above and in FIG. 3, a solar/electric coffee maker can be easily manufactured by making a minor change to an electric heated drip coffee maker or by reequipping an existing electric heated drip coffee maker.

Figure 4:
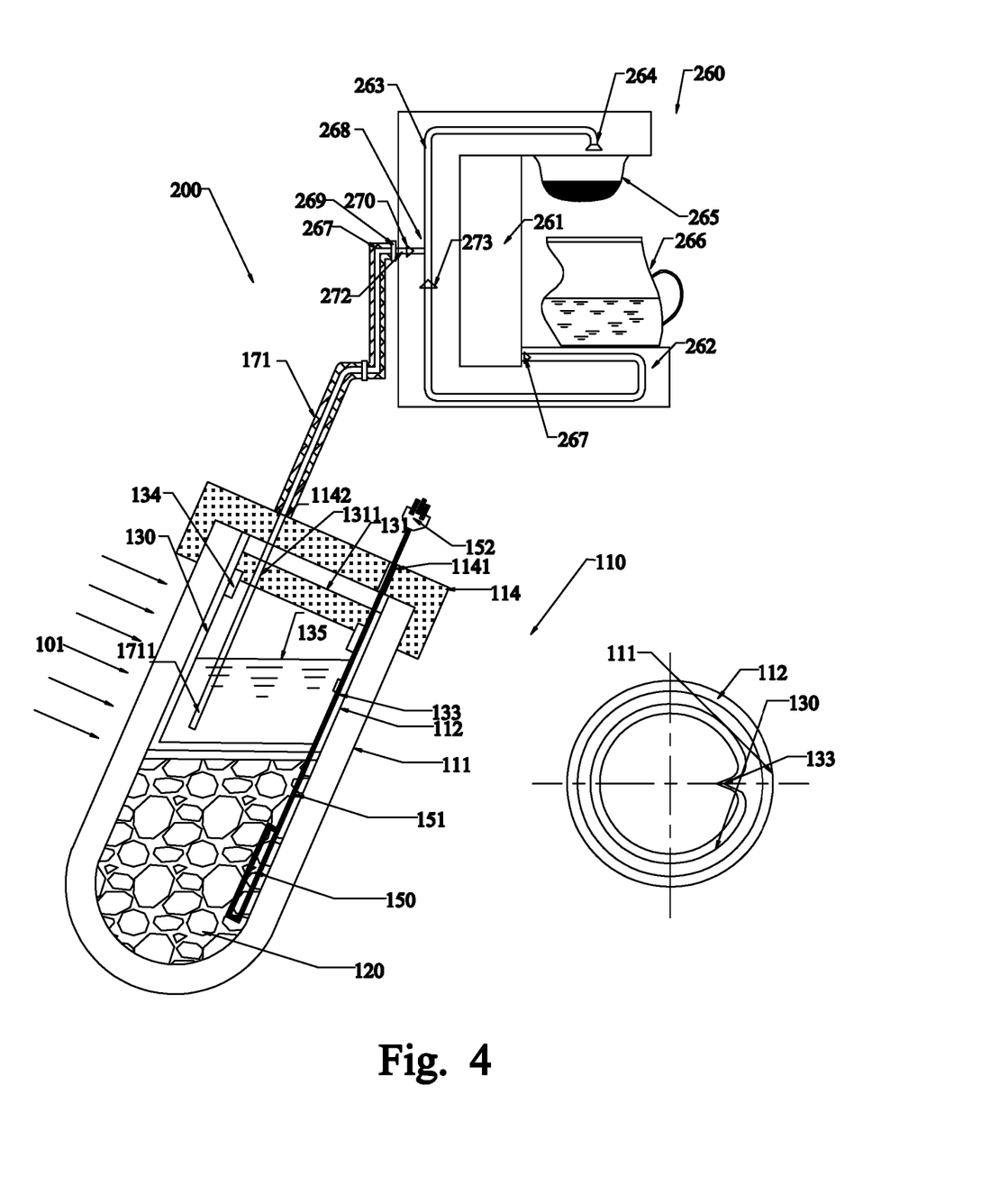
FIG. 4 is a schematic diagram illustrating another exemplary solar coffee/tea maker in vertical section view.

Referring to FIG. 4, a schematic solar/electric coffee maker 200 is illustrated in vertical section view. To make the description simpler, the solar heat collector 110 including the filled heat storage and conducting material 120, the solar water boiler 130 and the connection conduit 171 are the same as mentioned in FIG. 3.

An electric coffee maker 260 has its cool water reservoir 261, electric heated tube 262, hot water tube 263, hot water shower head 264, punched coffee holder 265, coffee pot 266 and first one-way valve 267. These parts mentioned above are as the regular parts that any electric drip coffee maker may have. Comparing to the regular electric drip coffee maker, the major changes of a solar/electric coffee maker are as the following: a hot water tube 263 continues the electric heated tube 262 and leads the water up from the base of reservoir 261 to the drip area 265. This hot water tube 263 has a bypass tube 268 located upper the first one-way valve 267 and electric heated tube 262, but lower the shower head 264; a second one-way valve 270 for preventing hot water flowing backward to solar heat collector 110 is added. Its one end connects to the end of said bypass tube 268 and its opposite end connects to a connecting fitting 269 at said electric drip coffee maker 260 through third tube 272. The connecting fitting 269 is for receiving a hot water tube 171 from a solar water container 130.

A third one-way valve 273 is equipped at the hot water tube 263 between the bypass 268 and electric heated tube 262 for preventing hot water from solar heat collector flows toward electric heated tube 162; a hot water connecting conduit 171 is extended into said airtight solar heated water container 130 through the holes 1142 and 1311. Its one end is submerged under the water level 135 in heated water container 130. The opposite end of said hot water connecting conduit 171 is connected with said conduit connecting fitting 269 at electric drip coffee maker 260.

When the solar light 101 shines on the solar heat collector 110, the solar heat collector absorbs the solar heat and stores it in the heat storage and conduction material 120. When the water container 130 is put into the solar heat collector 110 and the cool water is poured in, the solar heat is transferred to the solar water container 130 through the inner wall 112, heat storage and conducting material 120 and heats the water. The conduit 171's end 1711 is submerged under the water in the water container 130. The water container 130 is airtight. When the water is heated to boiling, the water steam gathered in the upper space of the container forces the hot water flows up the conduit 171 and 263. Then the hot water is dispersed to drip evenly on the coffee grounds waiting on the coffee holder 165 through the shower head 264. The hot water picks up the coffee essence and down into the coffee port 266. A coffee making processing is completed. When solar heat collector 110 works, the added one-way valve 273 prevents the water flows toward electric heated tube 262.

When the solar energy is not enough, plug the electric heated tube 162. The cool water from 261 flows through the first one way valve 267 and is heated in electric heated tube 262 until boiling. The bubble in boiled water forces the hot water up to the shower head 264 through hot water tube 263 to make coffee. The processing is the same as the processing in any kind of electric drip coffee maker.

When solar heat collector 110 works, the one-way valve 273 prevents the water flows toward electric heated tube 262. When electric drip coffee maker 260 works, the added one-way valve 272 prevents the water flows toward solar heat collector 110. If necessary, two heating sources also can work together. As mentioned in FIG. 1, an empty solar heat collector tube 110 can replace the hot water container 130 to heat the water and make coffee.

Figure 5:
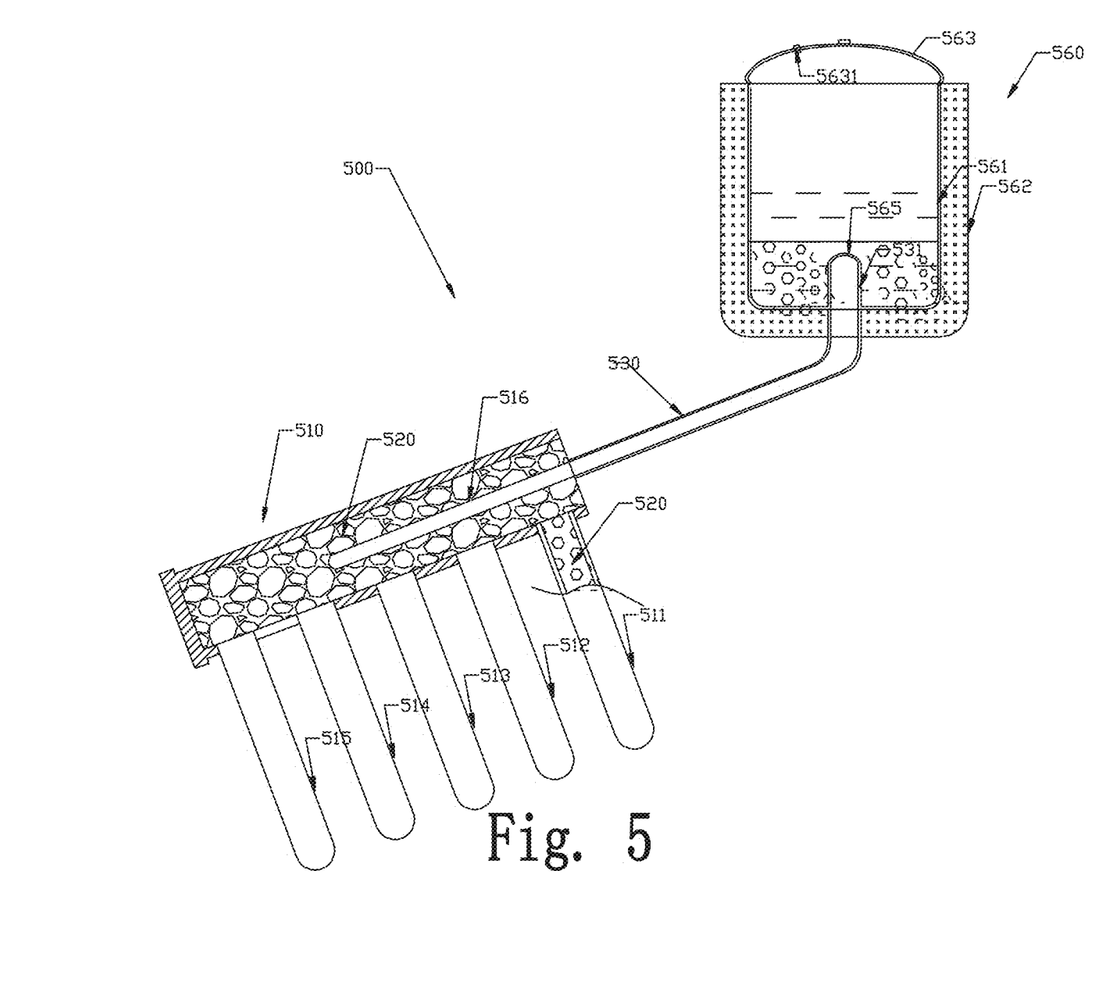
FIG. 5 illustrates schematically an alternative solar cooking appliance in vertical section view that transfers the solar heat by the direct connection.

FIG. 5, illustrates schematically a set of solar cooking appliances 500 in vertical section view that uses a heat tube as the second heat conducting/transferring material. The solar heat collector 510 is a group of 5 modular evacuated-tube solar heat collectors that mounted in a row. The number of the modular evacuated-tubes in this embodiment is 5, but it can be changed based on the cooking requirement. The solar heat collector 510 is filled with turves 520 in both converge tube 516 and the evacuated tubes 511, 512, 513, 514, and 515. An electric power solar cooking utensil has a utensil 561 located in a heat insulation greatcoat 562. It has a two layer glass lid 563 with a hole 5631. A fitting 565 is arranged for receiving a heat tube 530 from the solar heat collector 510. The heat tube 530's one end is inserted into the converge tube 516. The opposite end 531 of the heat tube 530 is inserted into the fitting 565 in the cooking utensil 561. The two end of the converge tube 516 are closed and heat insulated. When the solar heat collector 510 is at work, the evacuated tubes absorb the heat and store it in the turves in the solar heat collector 510. The heat tube 530 transfers the solar heat to the cooking utensil 561 for food cooking. After cooking, the utensil 561 is removed from the heat insulation greatcoat and a heat insulation mass is inserted in the heat insulation greatcoat. It is to keep the solar cooking system in a high working temperature for next cooking.

Figure 6:
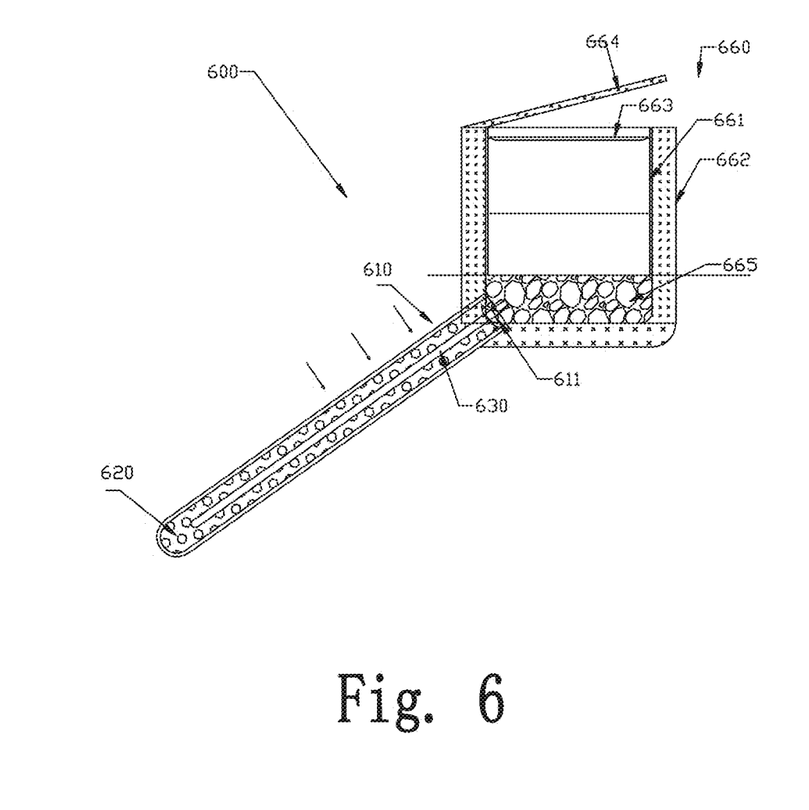
FIG. 6 illustrates schematically another solar cooking appliance in vertical section view that uses heat tubes as the heat-transferring medium.

FIG. 6 illustrates schematically an alternative solar cooking appliance 600 in vertical section view. The appliance transfers the solar heat by directly connecting the graphite 620 in a solar heat collector 610 to the graphite under an solar cooking utensil 661. For a faster solar heat transferring, a second heat conducting/transferring material 630 is added in between the solar heat collector 610 and the space 665. 630 may be a heat tube. The solar heat collector 610 is an evacuated-tube solar heat collector filled with graphite 620. An electric powered solar cooking utensil 660 has a cooking utensil 661 with a lid 663. Utensil 661 is located in a heat insulation 662 with a lid 664. There is a space 665 between the bottom of the cooking utensil 661 and the insulation 662. A first solid heat storage and conducting material is filled in the space. It can be same graphite or different kind of first solid heat storage and conducting material. In this case it is graphite too. The end of the evacuated tube 610 is extended into the space 665. The graphite 620 in solar heat collector 610 and the graphite in the space 665 are connected closely. When solar heat collector is at work, the collected solar heat is transferred from the graphite 620 in the evacuated tube 610 to the graphite in the space 665 by both graphite and heat tube. The solar heat cooks the food in the cooking utensil 661. Usually the evacuated-tubes mounted in a raw for cooking several foods at the same time.

Figure 7:
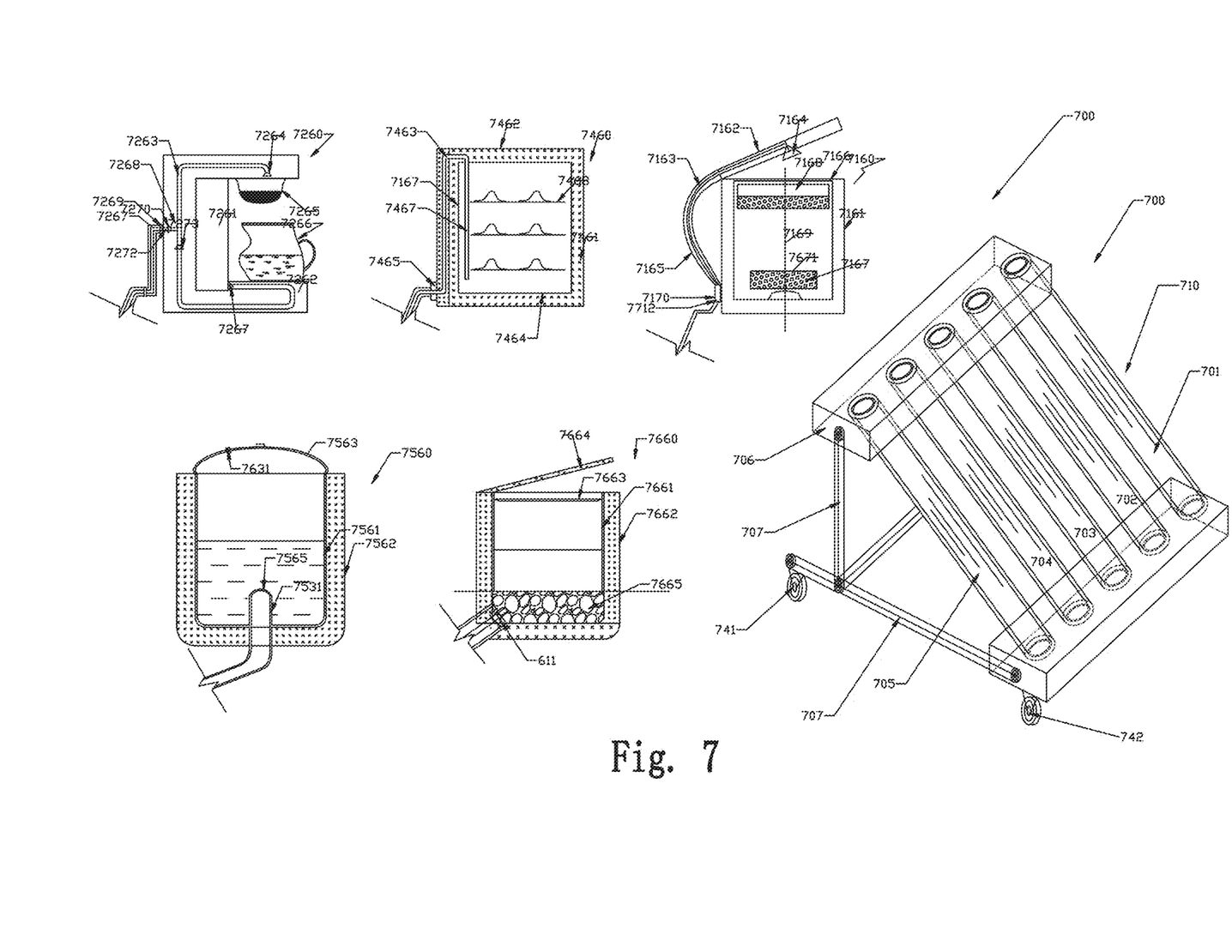
FIG. 7 is a schematic diagram multi mounted solar heat collectors and of a set of cooking utensils that can connect to the heat collectors to form the solar cooking appliance.

Referring to FIG. 7, a set of solar cooking appliances 700 with different cooking utensils is illustrated schematically in perspective view and vertical section view. Five evacuated tube solar heat collector 701, 702, 703, 704 and 705 are mounted in a parallel raw illustrated in perspective view. Five solar cooking utensils including the coffee/tea maker 7160, the electric coffee maker 7260, the steamer 7460, and the electric power solar cooking utensils 7560 and another electric power solar cooking utensils 7660 are put at one side of the solar heat collector 710, and are illustrated in vertical section view. Each solar heat corrector is filled with different heat storage and conducting material and has different way to connect the utensil as described previously.

All of them have been described in details in the FIG. 3, FIG. 4, FIG. 5, FIG. 6 and FIG. 7. The only different is that in FIG. 7, number "7" is added to each element number of each solar cooking utensil. For example, the solar cooking utensil 160 in FIG. 1 has a new number 7160 in FIG. 7. The rest may be deduced by analogy. We'll not repeat the descriptions again.

A fixing and supporting trestle 706 arranges and supports the five solar heat collectors at the proper locations and situations. The movable support 707 allows an adjustment of the incidence angle of the solar heat collector 710 to the sun light. Four wheels 741, 742, 743, and 744 (743 and 744 are not shown in FIG. 7) are placed at the four bottom corners of the supporting trestle 706 for adjust the direction of the solar heat collector 710. An optional sundial (not shown in FIG. 7) is a cone bar, which attaches to the solar heat collector 710 perpendicularly, can be employed for indicating the incidence angle of sunlight. An optional light reflecting object (not shown in FIG. 7) can also be positioned under the evacuated-tube for focusing the surrounding sun light to the solar heat collector. When the solar light shines on the solar heat collector 710, the cooking processing in each utensil is the same as the processing as mentioned before.

Figure 8:
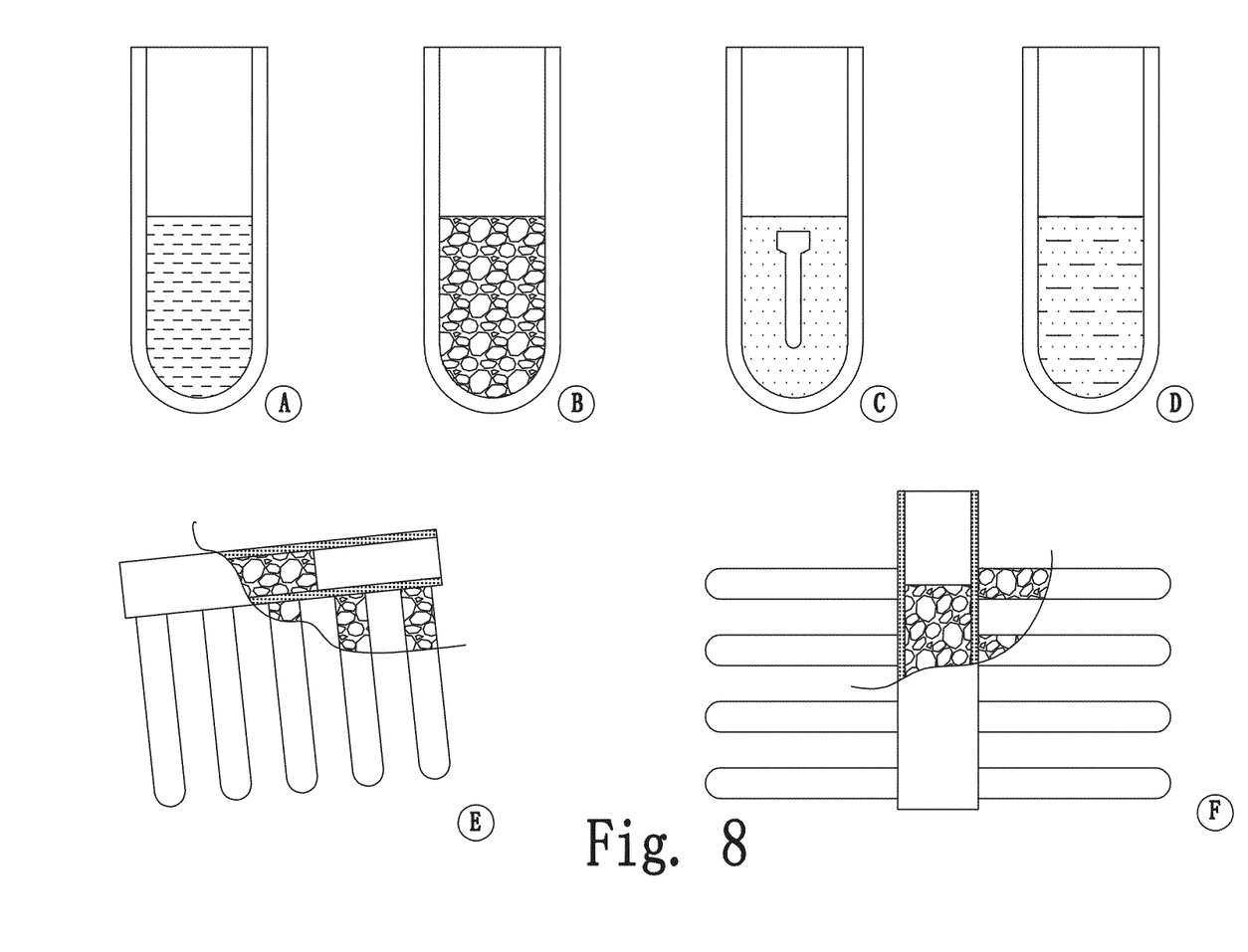
FIG. 8 illustrates a set of exemplary solar heat collectors in various formations and material.

Referring to FIG. 8, a set of exemplary solar heat collectors are illustrated schematically in vertical sections. FIG. 8A is a schematic vertical section view of an evacuated-tube solar heat collector filled with liquid heat storage and conducting material, e.g. water or oil. In some cases, besides being a heat storage and conducting material, water can also be a heat transferring medium for food cooking. FIG. 8B is a schematic vertical section view of an evacuated-tube solar heat collector filled with solid heat storage and conduction material, e.g. ore stone or turves. FIG. 8C is a schematic vertical section view of an evacuated-tube solar heat collector filled with sand and having a heat tube or a heat conductor as the second heat conducting/transferring material. FIG. 8D is a schematic vertical section view of an evacuated-tube solar heat collector filled with a combination of first solid heat storage and conducting material and second liquid heat conducting/transferring material, e.g. quartz sand and cooking oil. FIG. 8E is a schematic partial vertical section view of a group of modular evacuated-tube solar heat collectors that mounted in a vertical parallel raw. FIG. 8F is a schematic partial vertical section view of a group of modular evacuated-tube solar heat collectors that mounted in a horizontal parallel raw. When set up a solar cooking appliance, not only these kinds of solar heat collectors but also more kinds of their varieties and combinations can be selected and used. Based on above detailed descriptions and discussions of the samples, other modifications will be apparent to those skilled in the art and, therefore, the invention is defined in the claims.

What is claimed is:
1. A solar cooking appliance, comprising:
   a solar heat collector for collecting and storing solar heat;
   a first solid heat storage and conducting material for storing and conducting solar heat, wherein said solid heat storage and conducting material placed within said solar heat collector, wherein said solar heat collector can heat said solid heat storage and conducting material to a temperature higher than the water boiling temperature;
   a first heat insulated solar cooking utensil positioned out of the solar heat collector, having a cooking utensil and a heat insulation;
   a heat-transferring and conducting apparatus connected thermally to said solar heat collector and to said first heat insulated solar cooking utensil for transferring solar heat; wherein said heat transferring/conducting apparatus comprises:
   a second airtight solar cooking utensil containing a liquid and located in the solar heat collector; and having a removable part with a hole; and a liquid conduit passing through said hole, wherein said liquid conduit has a first open end and a second open end, said first open end is extended into said second airtight solar cooking utensil via said hole and submerged into said liquid, and said second open end is connected to said first heat insulated solar cooking utensil;

wherein said liquid is water.

2. The solar cooking appliance according to claim 1, wherein said solar heat collector is selected from a group of:
- a solar heat collector having one open end;
- an evacuated-tube solar heat collector;
- a plurality of evacuated solar heat collector;
- a plurality of modular evacuated-tube solar heat collectors;
- an evacuated-tube solar heat collector having one open end.

3. The solar cooking appliance according to claim 1, wherein said first solid heat storage and conducting material is selected from the group of:
- a solid chemical heat storage material;
- a solid phase change material;
- an ore; a metal;
- a sand;
- a salt;
- a soil;
- a quartz sand;
- a basalt sand;
- a CaO;
- a solid multi-water chemical;
- a paraffin;
- a turves;
- a graphite; and
- plumbaginous paraffin (graphite and paraffin).

4. The solar cooking appliance according to claim 1, wherein said first solar cooking utensil is further selected from the group of:
- a utensil made of a material selected from the group of: a metal, a glass, a ceramic, a plastic, a synthetic material, a plant fibre, a stainless steel and a hybrid combination of above mentioned materials;
- a utensil located in a heat insulated container;
- a coffee maker;
- an electric drip coffee maker comprising an one way valve for directing a solar heated water flow and a water conduit connected the drip coffee maker with the solar heat collector;
- a tea maker;
- an utensil having a heat insulation coating;
- a heat insulated electric power cooking utensil with operating parameter measuring, indicating and controlling devises and system; and
- a utensil having a two layer toughness glass lid.

5. The solar cooking appliance according to claim 1, further comprises an accessory selected from the group of:
- a fixing and supporting trestle for arranging and supporting each part of the solar cooking appliances at a proper position, and said trestle further comprising one or more of a structure allowing the adjustment of an incidence angle of the solar heat collector to a sun light,
- a light reflecting object to focus a surrounding sun light to the solar heat collector;
- a sundial attached to the solar heat collector perpendicularly for showing the angle of the sun light;
- a suitcase wherein the elements of the solar cooking appliances are arranged and packaged to form a portable solar cooking appliance;
- an electric power heater with a measuring and indicating devise for operation parameter selected from a group of temperature, timing, pressure, moisture;
- an electric power heater with a measuring and controlling system;
- a transparent protective cover protecting said evacuated tube solar heat collector for safety reason; and
- a transparent plastic protective mantle protecting said evacuated tube solar heat collector.

6. The solar cooking appliance according to claim 1, wherein the first heat insulated solar cooking utensil is a heat insulated electric power cooking utensil.

7. The solar cooking appliance according to claim 1, wherein said first heat insulated solar cooking utensil is selected from a group of:
- a heat insulated electric power cooking utensil to provide electricity as a backup heat source, having a fitting to receive said heat-transferring/conducting apparatus directly for transferring the solar heat from said solar heat collector to said cooking utensil.

8. The solar cooking appliance according to claim 1, further comprising an electric heat element with power supply located in said solar heat collector.

9. The solar cooking appliance according to claim 1, wherein said electric heat element comprises a measuring and indicating device.

10. The solar cooking appliance according to claim 1, wherein said liquid is transported from said second airtight solar cooking utensil to said first heat insulated solar cooking utensil via said conduit.

* * * * *